United States Patent [19]

Wright et al.

[11] Patent Number: 4,836,238

[45] Date of Patent: Jun. 6, 1989

[54] UNITARY VALVE FILTER COMBINATION

[75] Inventors: William L. Wright, Ontario; Benjamin D. Mendoza, Fontana, both of Calif.

[73] Assignee: Robert Manufacturing Co., Rancho Cucamonga, Calif.

[21] Appl. No.: 155,168

[22] Filed: Feb. 12, 1988

[51] Int. Cl.$^4$ .......................... F16K 43/00; F16K 3/02
[52] U.S. Cl. .................................. 137/315; 137/544; 251/327
[58] Field of Search ............... 137/238, 315, 390, 434, 137/442, 443, 444, 544, 549; 210/463; 251/324, 327, 329

[56] References Cited

U.S. PATENT DOCUMENTS

| | | | |
|---|---|---|---|
| 1,204,106 | 11/1916 | Wing | 137/549 |
| 2,780,232 | 2/1957 | Ney | 251/329 |
| 2,782,797 | 2/1957 | Hintermayr | 137/434 |
| 3,231,236 | 1/1966 | Hodel et al. | 251/324 |
| 3,471,123 | 10/1969 | Carlson et al. | 137/434 |
| 3,605,812 | 9/1971 | Richter | 251/324 |
| 3,762,443 | 10/1973 | Sorenson | 251/324 |
| 4,089,506 | 5/1978 | Blake | 251/327 |
| 4,456,026 | 6/1984 | Kantor | 251/329 |
| 4,550,896 | 11/1985 | Hansen, III | 137/549 |

FOREIGN PATENT DOCUMENTS

| | | | |
|---|---|---|---|
| 1238487 | 4/1967 | Fed. Rep. of Germany | 137/549 |
| 1804340 | 3/1970 | Fed. Rep. of Germany | 137/549 |

Primary Examiner—George L. Walton
Attorney, Agent, or Firm—Roth & Goldman

[57] ABSTRACT

A easily manufactured unitary valve and filter assembly of compact design allows replacement of the installed particulate filter without requiring difficult dissasembly. A cylindrical mesh filter is contained in a capped receptacle in the assembly and is accessible by removal of the cap. The shut off valve is operable to stop fluid flow while the filter is withdrawn from its receptacle in the assembly to be cleaned or replaced.

2 Claims, 2 Drawing Sheets

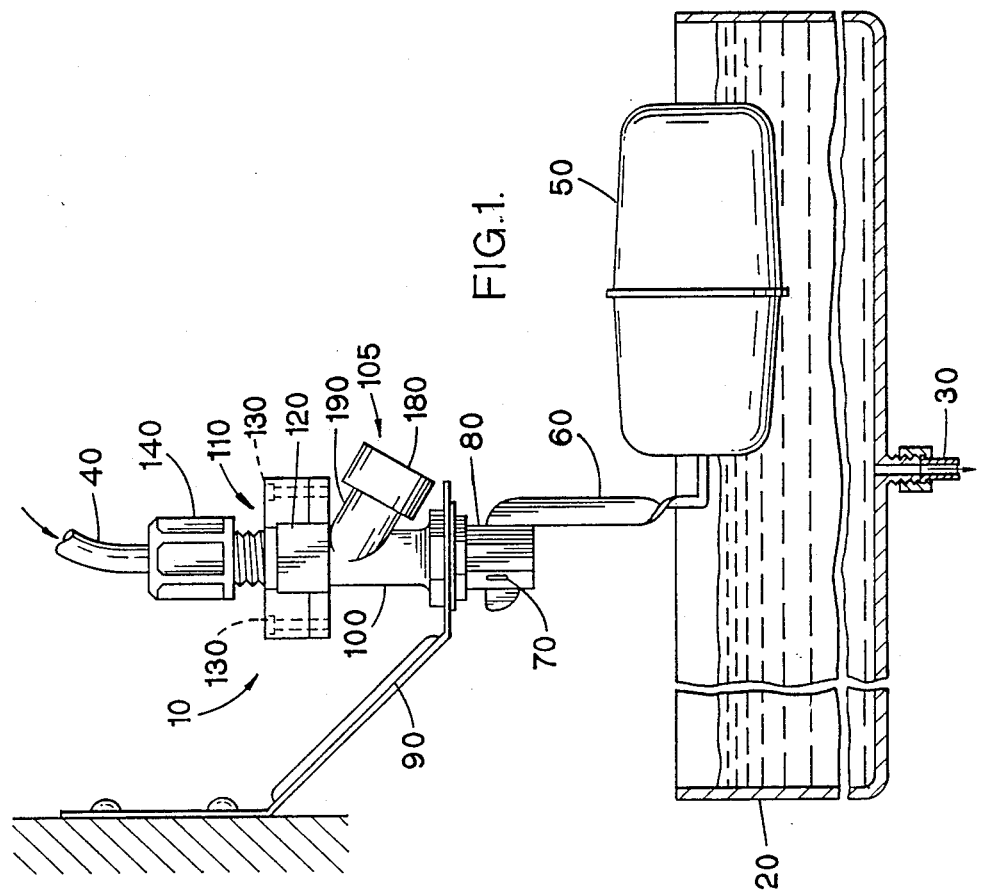

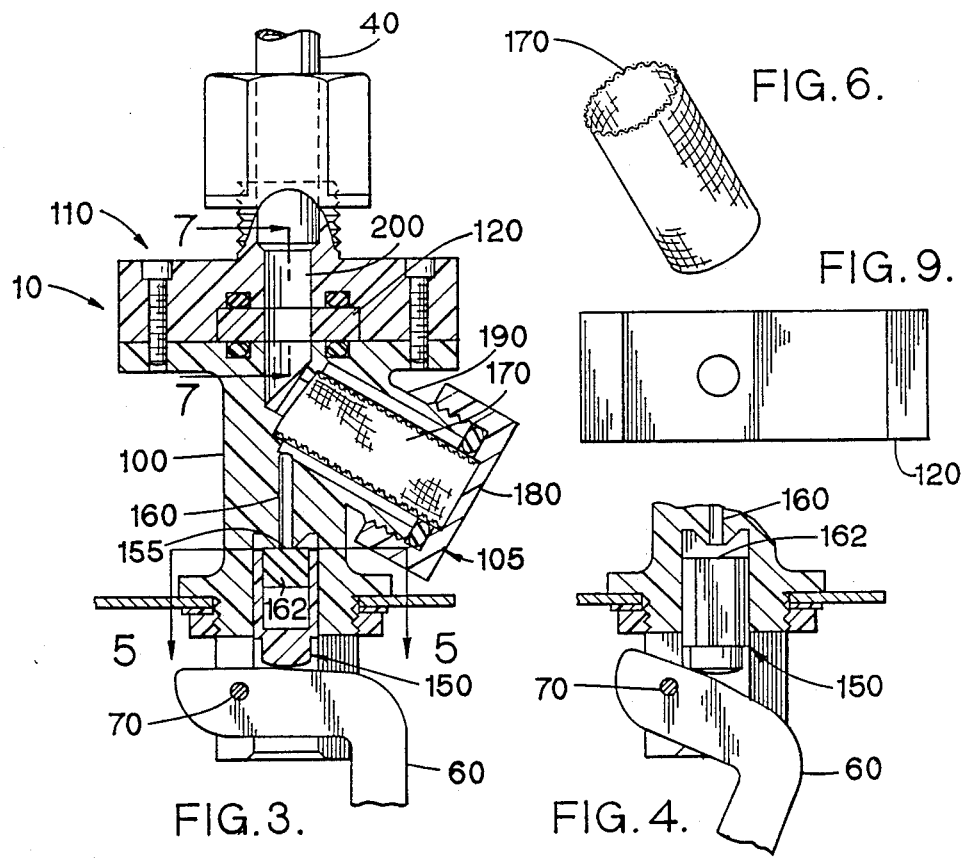
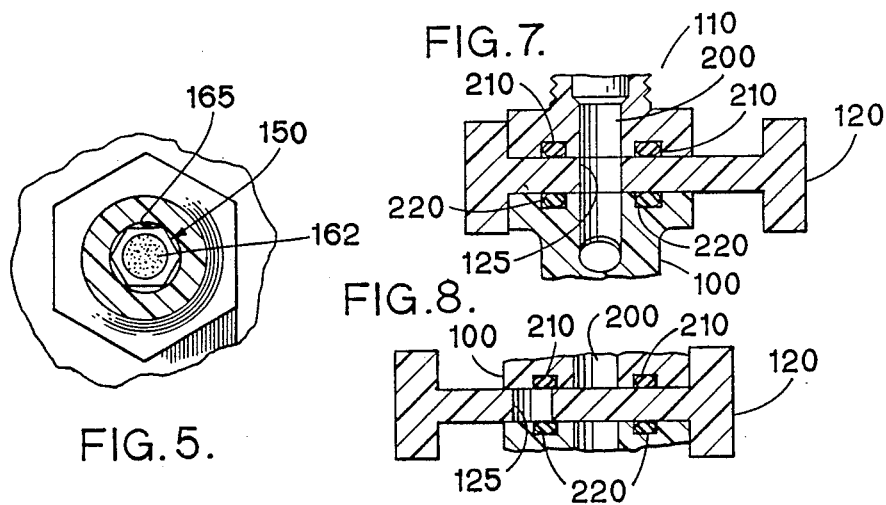

UNITARY VALVE FILTER COMBINATION

CROSS REFERENCE TO RELATED APPLICATIONS

This application contains subject matter common to the prior application Ser. No. 840,381, filed Mar. 17, 1986, entilted Liquid Control Assembly, and now U.S. Pat. No. 4,729,400 granted Mar. 8, 1988, by the present applicants of which the present application is a Continuation. Applicants claim the benefit of 35 U.S.C. 120 with respect to the common subject matter.

BACKGROUND OF THE INVENTION

The field of the present invention is liquid control systems. Various means for controlling flow of liquids into a liquid reservoir exist. One way to achieve such control is to place a float in the liquid reservoir and, when the reservoir is filled to capacity, the float will shut off a valve which otherwise allows the liquid to pass through the valve into the reservoir.

It is often essential that the liquid which passes through the valve be free of particles and other contaminants before it enters the reservoir. Otherwise, the particles might clog the valve, impede the flow of liquid from the reservoir, contaminate or damage a device which receives the liquid from the reservoir or otherwise create harmful results. In some prior applications, the contamination of the reseroir is avoided by forcing the liquid to flow through a valve assembly before entering the reservoir. Any particles or foreign matter are retained by the valve assembly. However, in these prior applications the foreign matter must be removed by turning off the source of the liquid and removing the valve assembly for cleaning.

Turning off the source of the liquid is often very inconvenient. For example, the turn-off valve may be inaccessible, or the liquid ssource may provide liquid for multiple functions thus requiring the liquid source to be turned off for all functions when the inlet valve assembly is cleaned.

Removing the valve assembly for cleaning is also often inconvenient. In some applications, the valve assembly is difficult to remove because it is not easily accessible. Furthermore, the parts of the valve assembly can be lost or broken upon removal and cleaning. Moreover, certain parts of the valve assembly are difficult to clean even after disassembly, especially the small passages that are usually found in such valves.

SUMMARY OF THE INVENTION

The present invention relates to a liquid control system from which particles or other foreign matter introduced into the system can be easily removed without turning off the source of the liquid and without removing the valve assembly. The present invention accomplishes this result by providing a means for independently shutting off the flow of the liquid into the inlet valve assembly and a means for separating particulate matter from the liquid, which means can easily be cleaned.

A particularly beneficial employment of the present invention is in conjunction with an ice-making machine. Ice-making machines are usually found in environments where there is little space and, therefore, the valve assembly is not readily accessible for cleaning. Moreover, the water from which the ice is made must be free of particulate or other foreign matter which might contaminate the ice, interfere with machine functions and require frequent and expensive cleaning of the machine. Therefore, in addition to providing the other advantages explained above, the present invention provides solutions to the just mentioned problems when used with an ice-making machine.

Accordingly, it is an advantage of the present invention to provide a liquid control system which cleans the liquid of particles and other foreign matter and which can easily and conveniently be cleaned of such foreign matter. Other and further advantages will appear hereinafter.

BRIEF DESCRIPTION OF THE DRAWINGS

FIG. 1 is a side view of a liquid control assembly embodying the present invention.

FIG. 2 is a front view of the liquid control assembly of FIG. 1.

FIG. 3 is a sectional side view of a portion of the liquid control assembly of FIG. 1.

FIG. 4 is a sectional side view of the lower portion of FIG. 3.

FIG. 5 is a sectional view of the valve body and valve closer taken along line 5—5 of FIG. 3.

FIG. 6 is a perspective view of the filter illustrated in FIG. 3.

FIG. 7 is a sectional front view of the shut-off slide valve in a deactivated state and the surrounding portion of the valve assembly taken along line 7—7 of FIG. 3.

FIG. 8 is a sectional view of the shut-off slide valve of FIG. 7 in an activated state and the surrounding portion of the valve assembly.

FIG. 9 is a top view of the shut-off slide valve of FIG. 7.

DETAILED DESCRIPTION OF THE PREFERRED EMBODIMENT

Turning in detail to the drawings, FIGS. 1 and 2 illustrate a liquid control assembly 10 used in conjunction with a reservoir 20, a reservoir outlet 30 and an inlet hose 40. The liquid control assembly 10 includes a float 50, a valve lever 60, a cotter pin 70, a bracket holder cap 80, a mounting bracket 90, a valve body 100, a filter assembly 105, a valve inlet housing 110, a shut-off slide valve 120, self-tapping screws 130 and an inlet cap 140. The valve body 100 and the valve inlet housing 110 comprise a valve body assembly.

In one preferred embodiment the liquid control assembly 10 is used in an ice-maker in which the assembly 10 controls the flow of water from a water source (not shown) to an ice-making machine (not shown). The valve lever 60 is made of stainless steel for strength and corrosion resistance. The cotter pin 70, mounting bracket 90 and self-tapping screws 130 are made of suitable metals. The rest of the liquid control assembly 10 is made of natural polypropylene in compliance with FDA standards. The valve body 100 is constructed of glass-filled polypropylene for strength or any other suitable materials.

As illustrated in FIGS. 1 and 2, when the reservoir 20 is full of water, the position of the float 50 on the surface of the water forces the vlave lever 60 to an up position. Referring now to FIG. 3, when the valve lever is in an up position, if pushes against the bottom of the valve closer 150, forcing the top of the valve closer 150 against the outlet opening 155 of the lower valve passage 160. The valve closer 150 seals the outlet opening 155 by means of a rubber inset 162 in the valve closer 150. This action seals the outlet opening 155 and prevents any water from passing through the liquid control assembly 10 to the reservoir 20.

On the other hand, as illustrated in FIG. 4, when the reservoir 20 is not full of water, the float 50 moves lower on the water surface, causing the valve lever 60 to rotate at the cotter pin 70 so as to allow the valve closer 150 to move away from the outlet opening 155 of the lower valve passage 160. This action permits water to pass through the liquid control assembly 10 into the reservoir 20. As is illustrated in FIG. 5, the water flows between the valve body inner wall 165 and the valve closer 150. The float 50, valve lever 60, cotter pin 70, valve closer 150 and outlet opening 155 comprise a first valve or shut-off means.

FIG. 3 illustrates the filter 170, the detachable filter cap 180 and the filter housing 190 and these elements comprise a particulate separating means or filter assembly. The filter 170 is pictured more clearly in FIG. 6. The filter preferably is in the form of a stainless steel mesh cylinder; however, it can also be made of other suitable material. The filter 170 is embedded inside the filter housing 190 which extends downwardly from the valve body 100 at an incline of approximately 60 degrees from the downward vertical axis of the valve body 100. After the filter housing fills with water, the water pressure from the water source (not shown) forces the water through the lower valve passage 160.

As shown by FIG. 3, the flow of water through the inlet hose 40 into the upper valve passage 200 must pass through the filter 70 before it reaches the lower valve passage 160. Therefore, any particles or foreign matter in the water will accumulate inside the filter assembly 105 and not clog the lower valve passages 160 or pass into the reservoir and clog the reservoir outlet 30. Furthermore, because of the inclined orientation of the filter housing and the somewhat circuitous route which the liquid flows from the upper valve passage 200 through the filter 70 and into the lower valve passage 160, the particles and other foreign matter gravitate to a lower end of the filter and do not clog the main flow path of the liquid through the liquid control assembly 10.

As is illustrated in FIG. 3, the diameter of the lower valve passage 160 is significantly smaller than the diameter of the upper valve passage 200. The smaller diameter of the lower valve passage 160 controls the rate of flow of the liquid into the reservior 20. The larger diameter of the upper valve passage 200 tends to create a constant flow of liquid through the lower valve passage 160.

FIGS. 7 and 8 further depict the shut-off slide valve 120 which prevents the source water from entering the valve main body 100 when the valve 120 is in a closed position. FIG. 7 shows the valve 120 in the open position. FIG. 8 shows the slide valve 120 in the closed position. FIG. 9 illustrates a top view of the shut-off valve 120, showing the configuration of the shut-off slide valve opening 125. When cleaning of the filter assembly 105 becomes necessary, the shut-off valve 120 can be slid into the closed position, making it unnecessary to turn off the water source. The detachable filter cap 180 can then be unscrewed so as to make the filter 170 accessible. The filter 170 can next be cleaned and easily put back in place. Finally, the cap 180 can be screwed on ant the shut-off slide valve 120 placed into an open position, making the liquid control assembly 10 functional again. Slide valve seals 210 and 220 seal the upper valve passage 200 within the valve inlet housing 110 and the valve body 100 respectively from the outside of the liquid control assembly 10. These seals 210 and 220 are rubber O-rings in one preferred embodiment of the invention and can be self-lubricated with kemamide, which is especially beneficial in the cold environment of an ice-making machine. As can be seen from FIGS. 7 and 8, the seals 210 and 220 are functional whether the shut-off slide valve is in an open or closed position.

While embodiments and applications of the invention have been shown and described, it would be apparent to those skilled in the art that certain modifications are possible without departing from the inventive concepts herein. The invention, therefore, is not to be restricted except in the spirit of the appended claims.

What is claimed is:

1. A unitary fluid valve and filter assembly for coupling fluid between an inlet passage and an outlet passage, said inlet passage being of a first predetermined diameter and said outlet passage being of a second predetermined diameter, said first diameter being larger than said second diameter, comprising:

a first housing portion formed of plastic material;
said first housing portion containing: a top wall, outer side walls, an underside wall, a first fluid passage extending axially through said underside wall; a seal receiving annular goove within said underside wall located coaxial with said axial passage; first o-ring seal means seated within said annular groove of said first housing portion;
a first cylindrical projecting portion containing a fluid passage; said first cylindrical portion being integral with said top wall portion of said first housing portion and being located coaxial with said fluid inlet passage to form an extension of said fluid inlet passage, said projection portion containing a threaded outer wall for permitting coupling to an internal threaded coupling member;
a second housing portion formed of plastic material;
said second housing portion containing: outer side walls, a top inner wall; a bottom wall, an axial fluid passage extending through said top inner wall; a seal receiving annular groove coaxial with said top inner wall; second o-ring seal means seated within said annular groove of said second housing portion;
said second housing portion further containing a second extending hollow cylindrical portion extending from said bottom wall of said second housing portion, said hollow interior thereof defining a fluid outlet passage; said second extending hollow cylindrical portion and said cylindrical projecting portion being oriented coaxially;
said first and second housing portions adapted to matingly engage in a position with said underside wall of said first housing portion facing the upperside wall of said second housing portion and with said fluid passage in each portion being in alignment to define a fluid passage and further defining therebetween a rectangular shaped passage through and between the right and left side walls, said passage being located orthogonol to and traversing said fluid passages in each said first and second housing portions;
an elongated rectangular member fourmed of plastic material having a rectangular cross section shape; said rectangular member being located within said rectrangular shaped passage defined by said housing members and being sandwiched between said first and second housing portions in slidable engagement with each of said first and second o-ring seals; each of said first and second o-ring seal means being coated with a lubricating means for facilitating sliding movement or said rectangular member;

fastening means connecting said first and second housing portions together with the fluid passages in said first and second portions being in alignment to define a portion of the fluid passage through said housing and with said rectangular member sandwiched therebetween; said fastening means comprising at least two self tapping screws;

said rectangular member containing a passage therethrough located asymmetrically between the ends of said rectangular member, the distance between one end of said rectangular member and the center of said rectangular member passage being equal to the distance between an outer side wall of said second housing portion and said axial passage in said second housing portion; whereby slidable movement of said member in one direction aligns said passage with said axial passage to complete a fluid passage therethrough and movement in the opposite direction positions a surface of said member confronting said axial passage to close the fluid passage therethrough;

first and second finger operable push members located at the ends of said rectangular member for permitting sliding movement of said member responsive to finger pressure applied to said push members; said push members being larger than the cross section of said rectangular shaped passage for limiting the movement of the member upon contact of a respective one of said push members with the respective adjacent wall of a housing portion;

said second housing portion further containing a third hollow cylindrical protruding portion extending at an angle of approximately sixty degrees to said second extending hollow cylindrical portion, said third hollow cylindrical protruding portion being integrally joined to said second cylindrical portion, said third cylindrical protruding portion defining a cylindrical internal compartment;

said cylindrical internal compartment having an internal end containing a central opening and an annular wall surrounding said central opening for allowing fluid to pass between said compartment and said defined fluid passage in said second housing portion, and, further having an internal cylindrical side wall bordering said annular wall, said internal cylindrical side wall including an opening located adjacent said annular wall for allowing fluid to pass between said compartment and said defined fluid outlet passage;

said third protruding portion further containing a threaded outer wall and a circular end rim;

cap means for closing an end of said third protruding portion; said cap means containing a threaded internal cylindrical wall for threadingly engaging the threads on the outer wall of said third protruding portion and further including an inside end surface; said cap means being grippable by hand to permit manual application and removal thereof with one hand;

third o-ring seal located within said cap means for engaging said circular end rim of said third projecting portion to prevent fluid leakage; and a steel mesh filter of hollow cylindrical shape, said mesh filter being of a predetermined diameter and having first and second ends; said filter being located within said cylindrical internal compartment with a first end of said mesh filter engaging said annular wall and said second end of said mesh filter engaging said inside end surface of said cap means; said cap means inside end surface including a short circular shaped recessed portion for receiving an end of said filter means, said recessed portion of said cap means being of an outer diameter that is slightly larger than said predetermined diameter of said filter means for permitting said mesh filter end to fit within said recessed portion.

2. A unitary fluid valve and filter assembly for coupling fluid between an inlet passage and an outlet passage, comprising:

a first housing portion formed of plastic material;

said first housing portion containing: a top wall, outer said walls, an underside wall, a first fluid passage extending axially through said underside wall; a seal receiving annular goove within said underside wall located coaxial with said axial passage; first o-ring seal means seated within said annular groove of said first housing portion;

a first cylindrical projecting portion containing a fluid passage; said first cylindrical portion being integral with said top wall portion of said first housing portion and being located coaxial with said fluid inlet passage to form an extension of said fluid inlet passage, said projecting portion containing a threaded outer wall for permitting coupling to an internal threaded coupling member;

a second housing portion formed of plastic material;

said second housing portion containing: outer side walls, a top inner wall; a bottom wall, an axial fluid passage extending through said top inner wall; a seal receiving annular groove coaxial with said top inner wall; second o-ring seal means seated within said annular groove of said second housing portion;

said second housing portion further containing a second extending hollow cylindrical portion extending from said bottom wall of said second housing portion, said hollow interior thereof defining a fluid outlet passage; said second extending hollow cylindrical portion and said first cylindrical projection portion being oriented coaxially;

said first and second housing portions adapted to matingly engage in a position with said underside wall of said first housing portion facing the upperside wall of said second housing portion and with said fluid passages in each portion being in alignment to define a fluid passage and further defining therebetween a rectangular shaped passage through and between the right and left side walls, said passage being located orthogonol to and traversing said fluid passages in each of said first and second housing portions;

an elonganted rectangular member formed of plastic material having a rectangular cross section shape; said rectangular member being located within said rectangular shaped passage defined by said housing members and being sandwiched between said first and second housing portions in slidable engagement with each of said first and second o-ring seals;

each of said first and second o-ring seal means being coated with a lubricating means for facilitating sliding movement or said rectangular member;

said first and second housing portions being joined together with the fluid passages in said first and second portions being in alignment to define a portion of the fluid passage through said housing and with said rectangular member sandwiched therebetween;

said rectangular member containing a passage therethrough located asymmetrically between the ends of said rectangular member, the distance between one end of said rectangular member and the center of said rectangular member passage being equal to the distance between an outer side wall of said second housing portion and said axial passage in said second housing portion; whereby slidable movement of said member in one direction aligns said rectangular member passage with axial passage to complete a fluid passage therethrough and movement in the opposite direction positions a surface of said member confronting said axial passage to close the fluid passage therethrough;

first and second finger operable push members located at the ends of said rectangular member for permitting sliding movement of said member responsive to finger pressure applied to said push members; said push members being larger than the cross section of said rectangular shaped passage for limiting the movement of the member upon contact of a respective one of said push members with the respective adjacent wall of a housing portion;

said second housing portion further containing a third hollow cylindrical protruding portion extending at an angle of approximately sixty degrees to said second extending hollow cylindrical portion, said third hollow cylindrical protruding portion being integrally joined to said second cylinderical portion, said third cylindrical protruding portion defining a cylindrical internal compartment;

said cylindrical internal compartment having an internal end containing a central opening and an annular wall surrounding said central opening for allowing fluid to pass between said compartment and said defined fluid passage in said second housing portion, and, further having an internal cylindrical side wall bordering said annular wall, said internal cylindrical side wall including an opening located adjacent said annular wall for allowing fluid to pass between said compartment and said defined fluid outlet passage;

said third protruding portion further containing a threaded outer wall and a circular end rim;

cap means for closing an end of said third protruding portion; said cap means containing a threaded internal cylindrical wall for threadingly engaging the threads on the outer wall of said protruding portion and further including an inside end surface; said cap means being hand grippable by a hand to permit manual application and removal thereof with one hand;

means within said cap means for engaging a portion of said circular end rim of said third projecting portion to provide a seal for preventing fluid leakage from said cylindrical internal compartment;

a mesh filter of hollow cylindrical shape, said mesh filter being of a predetermined diameter and having first and second ends; said mesh filter being located within said cylindrical internal compartment with said first end of said mesh filter engaging said annular wall and with said opposed second end of said mesh filter engaging said inside end surface of said cap means; said cap means inside end surface including a short circular shaped recessed portion for receiving an end of said filter means; said recessed portion being of said cap means being of an outer diameter slightly larger than said predetermined diameter of said filter means for permitting said mesh filter end to fit within said recessed portion.

* * * * *